United States Patent
Hadfield

[15] 3,656,023
[45] Apr. 11, 1972

[54] PROTECTIVE CIRCUIT

[72] Inventor: Joseph M. Hadfield, 5725 North Melvin Avenue, Chicago, Ill. 60646

[22] Filed: Sept. 21, 1970

[21] Appl. No.: 73,718

[52] U.S. Cl. ............................ 317/13 R, 317/40 R, 317/46
[51] Int. Cl. .................................................... H02h 7/085
[58] Field of Search ............... 317/13 R, 46, 40 R; 318/472, 318/473, 221 A, 221 R

[56] References Cited

UNITED STATES PATENTS 2,470,257   5/1949   Moore ............................ 317/13 X Primary Examiner—James D. Trammell
Attorney—Hill, Sherman, Meroni, Gross & Simpson

[57] ABSTRACT

A protective circuit for a load such as an unattended electric motor which operates in response to a control circuit. A heater control circuit is controlled by the control circuit such that power is not applied to the heaters when the control circuit demands that the load be energized. In the event that the main power contacts weld or stick and do not release when the control turns off, contacts to the heaters are closed so that the heaters open bimetallic heat responsive switches in the main power lines.

A modification of the invention is provided for loads of very high power requirements and include large oil switches or air break circuit breakers which are energized if the main power contacts fail to open.

6 Claims, 2 Drawing Figures

Patented April 11, 1972
3,656,023
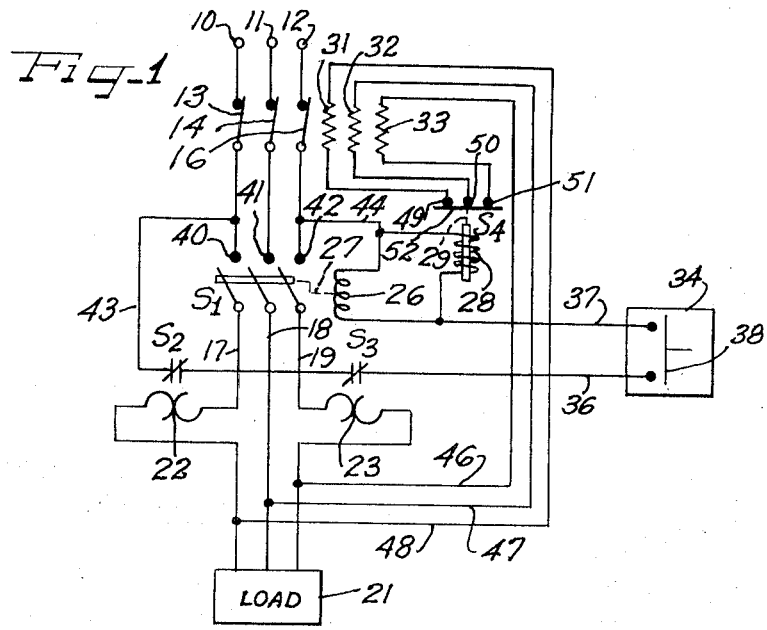
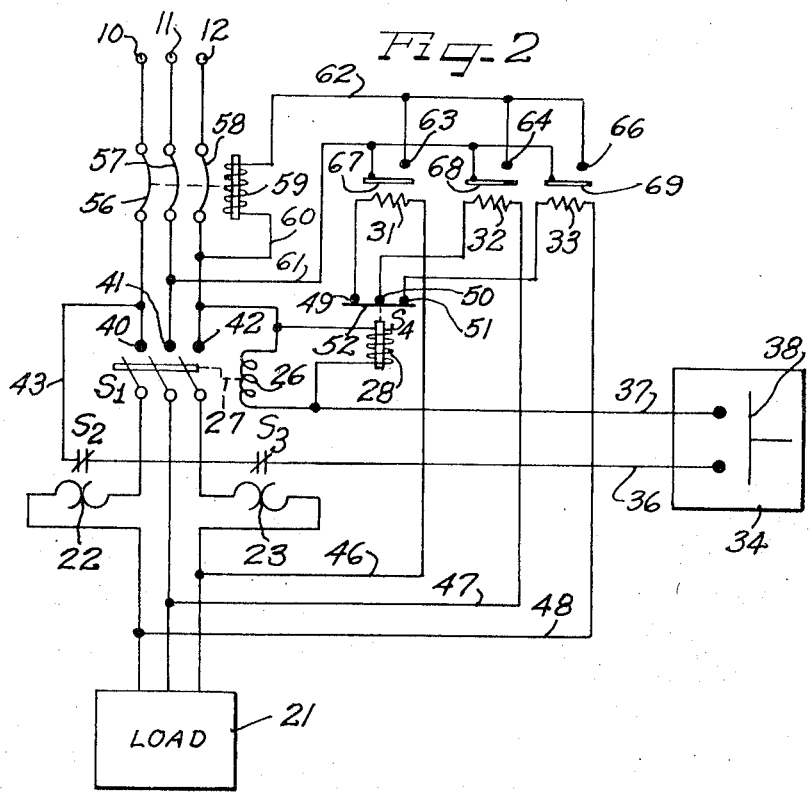
INVENTOR.
Joseph M. Hadfield
BY Kill, Sherman, Meroni, Gross & Simpson ATTORNEYS

3,656,023

PROTECTIVE CIRCUIT

BACKGROUND OF THE INVENTION

1. Field of the Invention

This invention relates in general to protective circuits for motors or other loads which may operate unattended and which would be injured or destroyed if allowed to continuously operate on failure of a conventional control means.

2. Description of the Prior Art

The use of fuses or thermal overload relays in circuit with a load such as a motor is conventional. However many loads such as motors are designed to periodically operate at stations where the motor is unattended for long periods of time and in the event the power is continuously applied to the load due to welding or sticking of the power contact the motor will be injured or even destroyed. For example, pumping stations utilize electric motor which are unattended and the motor and control circuits are designed such that the motor operates and drives a pump in response to a float valve for sensing the level of fluid. In the event the pump reduces the fluid to a level at which the motor should turn off and due to sticking or welding of the main power contact the power is not disconnected from the motor, it will continue to run until the bearings of the motor are injured or the motor is destroyed.

SUMMARY OF THE INVENTION

It is an object of the present invention to provide a protective circuit which includes heaters that are energized in the event the control circuit no longer requires that a load be energized but due to sticking or welding of the main power contacts power continues to be applied to the load. The heaters actuate temperature responsive switches as for example, bimetallic switches in circuit with the power supply so as to disconnect the load to prevent it from being injured or destroyed.

A modification of the invention provides protection for very high power loads and provides a secondary circuit for energizing oil switches or air break circuit breakers in the main power supply in the event that power is not disconnected to the load when the control circuit no longer requires actuation of the load.

Other objects, features and advantages of this invention will be readily apparent from the following description of certain preferred embodiments thereof taken in conjunction with the accompanying drawings, although variations and modification may be effected without departing from the spirit and scope of the novel concepts of the disclosure, and in which:

BRIEF DESCRIPTION OF THE DRAWINGS

FIG. 1 is a schematic view of the protective circuit of this invention; and

FIG. 2 is a schematic view of a modification of the invention.

DESCRIPTION OF THE PREFERRED EMBODIMENTS

The present invention provides a protective electrical circuit to trip out a load as for example a motor load in the event that magnetic contact coils in the switching mechanism to the motor fail to release due to residual magnetism or welding of contacts when the control circuit demands that the motor be turned off. For example, many motors are located in unattended pumping stations or sumps and are designed such that in the event that water passes into the sump a float type or other type of switch will close starting the motor which in turn drives a pump. Such motors might be unattended for long periods of time and in the event the power contacts fail to release after the water has been pumped out of the sump, the motor will continue to operate as long as the contacts are held together by residual magnetism or welding, for example. This would result in the motor being seriously injured, wearing out, or, even burning out the bearings, and the motor would have to be replaced frequently.

The present invention provides a secondary means of assuring that the power supply is disconnected from the motor or other load in the event the main power switch contacts stick.

For example, FIG. 1 illustrates power contacts 10, 11 and 12, which are connected to a suitable power supply as for example a three-phase A.C. source. Bimetallic switches 13, 14 and 16 are connected in series with the power contacts 10, 11 and 12 and are heat-responsive so as to open the power source line if subjected to heat. Contacts 40, 41 and 42 are connected to the other side of the bimetallic switches 13, 14 and 16 and a switch S1 connects power to a load 21 that might, for example be, a three-phase A.C. motor A thermal overload relay 22 is connected in series with a power terminal 10 and load 21 through the switch S1 and a thermal overload relay 23 is connected in series with the power terminal 12 and the load 21 through the switch S1.

Power contact 10 is connected through the bimetallic switch 13 to a lead 43 which connects to a normally closed switch S2 in series with a normally closed switch S3 to a lead 36 which is connected to a control circuit 34. A lead 37 is also connected to the control circuit 34 and is connected through a relay 26 to lead 44 which is connected to power terminal 12 through the bimetallic switch 16. The thermal overload relay 22 will open switch S2 if an overload occurs in power line 17 to the load. Overload relay 23 will open switch S3 if an overload occurs in line 19 to the load. The relay 26 is coupled by linkage 27 or otherwise to switch S1 to close it when the relay 26 is energized.

Heaters 31, 32 and 33 are mounted adjacent the bimetallic switches 13, 14 and 16 respectively, and have first sides connected by leads 46, 47 and 48 to power lines 17, 18 and 19. The other sides of the heaters 31, 32 and 33 are connected to contacts 49, 50 and 51 which are connected together by movable contact 52 of switch S4. A relay 28 is connected in parallel with relay 26 and is linked by linkage 29 to movable contact 52 of switch S4 to move it out of engagement with contacts 49, 50 and 51 when power is applied across the relay 28.

A switch actuator 38 is illustrated in the control 34 to make electrical contact between leads 36 and 37 to energize the load. It is to be realized that the control 34 may be a float control switch, a manual switch or any type of automatic control switch which periodically demands that the load be energized. When the control 34 demands that the load 21 be energized the switch actuator 38 makes contact between leads 36 and 37 which applies power to the relay 26 that closes switch S1 so that it engages contacts 40, 41 and 42 and power will be applied to the load 21 from the power terminals 10, 11 and 12. At the same time that the contact 38 completes the circuit between leads 36 and 37, the relay 28 will be energized to move the contact 52 out of engagement with the contacts 49, 50 and 51 and the heaters 31, 32 and 33 will not receive power. Thus, they will not heat the bimetallic strips 13, 14 and 16 and cause them to disconnect power to the load 21.

After the control 34 has been satisfied, for example, with the water in the sump being removed by the pump, the switch contact 38 will open disconnecting power to the relays 26 and 28 and the movable contact 52 will engage the contacts 49, 50 and 51. The relay 26 normally allows the switch S1 to open thus disconnecting power from the power terminals 10, 11 and 12 to the load 21. Simultaneously, when switch S1 opens power is disconnected to leads 46, 47 and 48 which are connected to the heaters 31, 32 and 33 and they do not heat up to cause the bimetallic switches 13, 14 and 16 to open the main power lines.

However, if when the switch 38 opens and the relays 26 and 28 are deenergized the switch S1 fails to open due to residual magnetism or welding of the contacts, power will continue to be applied to the load 21 from the power terminals 10, 11 and 12. In this event power will simultaneously be applied to the leads 46, 47 and 48 to the heaters 31, 32 and 33 which are mounted in a heat transfer relationship with the bimetallic switches 13, 14 and 16 respectively so as to cause them to open after the heaters have been energized for a time sufficient to actuate the bimetallic switches.

Thus the load will be protected from continuously operating when the switch S1 fails to open for any reason because of the protective features of the invention.

The thermal overload relays 22 and 23 are provided to protect for shorts and other failures in the load and open the switches S2 and S3 so as to disconnect the control circuit so that power will not be applied to the load.

FIG. 2 illustrates a modification of the invention that might be used for loads of very high power as for example 10,000 HP motors. Elements which are the same as those illustrated in FIG. 1 are designated by the same numerals although it is to be realized that in view of the higher power requirements for the embodiment illustrated in FIG. 2, the individual components may be selected with higher power ratings.

Instead of the bimetallic switches 13, 14 and 16 illustrated in FIG. 1, air breaks or oil switches 56, 57 and 58 are connected in series with the main power line between the power terminals 10, 11 and 12 and contacts 40, 41 and 42 of switch S1. Trip out coil 59 controls the air break or oil switches 56, 57 and 58. The trip out coil 59 has one terminal connected to contact 42 through lead 60. The other terminal of trip out coil 59 is connected to lead 62. Lead 62 is connected to contacts 63, 64 and 66 which are engageable by bimetallic contacts 67, 68 and 69 respectively. Lead 61 is connected to the bimetallic contacts 67, 68 and 69 and to contact 41. Heaters 31, 32 and 33 are mounted in a heat transfer relationship with the bimetallic contacts 67, 68 and 69 to heat them so that they engage contacts 63, 64 and 66 after power has been applied to the heaters 31, 32 and 33 for a predetermined time.

In operation, the control 34 periodically demands that power be applied to the load 21 by connecting leads 36 and 37. This energizes relays 26 and 28 to close switch S1 applying power from the power terminals to the load 21 and moves contact 52 from engagement with contacts 49, 50 and 51 so that power is not applied to the heaters 31, 32 and 33 through the leads 46, 47 and 48. The load 21 operates until the control 34 breaks the circuit between leads 36 and 37 de-energizing relays 26 and 28. Normally the switch S1 will open thus disconnecting the load 21 from the power supply. In the event this fails to happen due to welding of the contacts of the main power supply switch or otherwise, power will be applied to the heaters 31, 32 and 33 to leads 46, 47 and 48 and switch contact 52. Heaters 31, 32 and 33 will heat the bimetallic strips 67, 68 and 69 and cause them to move to engage contacts 63, 64 and 66. Whenever the first of these contacts engage, power will be applied to trip out coil 59 through leads 60 and 61 and the closed switch contact and the air break or oil switches 56, 57 and 58 will be opened by the trip coil 59 to disconnect power to the load and thus prevent it from continuously operating until the load is damaged or destroyed.

It is to be noted that the heaters 31, 32 and 33 are connected in star connection.

The protective circuit of this invention may be used for any type of electrical load for example; a load might be a heater used in plastic processing and the protective circuit would prevent overheating of the plastic in the event of failure of the main power switch to release when required. The load might also be a motor which drives an air compressor, for example, and as a matter of fact the circuit works with any load.

It is to be noted that the heaters 31, 32 and 33 illustrated in FIGS. 1 and 2 inherently provide a time delay after the control circuit removes power from the relay 28 before the protective circuit disconnects power. This prevents accidental disconnect from the main power source when satisfactory operation occurs. A time delay could also be provided by a magnetically operated dashpot of a conventional type, if desired.

Although in the preferred embodiments relays and mechanical switches are used as the switching means, it is to be realized that electronic switching may also be used such as the use of solid state transistorized switching circuits.

Although minor modifications might be suggested by those versed in the art, it should be under stood that I wish to embody within the scope of the patent warranted hereon all such modifications as reasonably and properly come within the scope of my contribution to the art.

What is claimed is:

1. A protective circuit for connecting a load to a source of power through a main power switch including:
   means for actuating said main power switch;
   detecting means detecting when said main power switch fails to open under control of said means for actuating and said detecting means is connected to said means for actuating said main power switch;
   auxiliary switching means connected between said source of power and said load and connected to said detecting means and actuated thereby and wherein said auxiliary switching means is heat responsive and said detecting means comprises a relay connected to said actuating means; and
   heating means connected in circuit with the load with a heating means switch connected to said heating means and controlled by said relay to disconnect power from the heating means when said actuating means holds said main power switch closed and applies power to said heating means when said actuating means releases the main power switch and it fails to open.

2. A protective circuit for connecting a load to a source of power through a main power switch including:
   means for actuating said main power switch;
   detecting means detecting when said main power switch fails to open under control of said means for actuating and said detecting means is connected to said means for actuating said main power switch; and
   auxiliary switching means connected between said source of power and said load and connected to said detecting means and actuated thereby, wherein said auxiliary switching means includes a trip relay, normally open heat responsive switch means connected to said trip relay, and said detecting means comprises a relay connected to said actuating means, heating means mounted in heat transfer relationship to said heat responsive switch means and connected in circuit with the load and a heating means switch connected to said heating means and controlled by said relay to disconnect power from the heating means when said actuating means holds said main power switch closed and to apply power to said heating means when said actuating means releases the main power switch and it fails to open.

3. A protective circuit for a load to be connected to a power supply comprising, a main power switch, an auxiliary switch and the main and auxiliary switches connected in series between the power supply and said load, a first relay for controlling said main power switch, a control switch connected to said power supply and said first relay, a second relay connected in circuit with said first relay, heating means, a heating switch controlled by said second relay and connected to said heating means and said load, and said heating means coupled to said auxiliary switch when the main power switch fails to open when said first relay is de-energized.

4. A protective circuit according to claim 3 wherein said auxiliary switch is temperature responsive and the heating means are mounted in a heat transfer relationship to said auxiliary switch.

5. A protective circuit according to claim 3 wherein said auxiliary switch includes a trip relay and temperature responsive switch means connected in circuit to said power supply, and said heating means mounted in a heat transfer relationship to said temperature responsive switch means.

6. A protective circuit according to claim 3 wherein said power supply comprises three-phase alternating current.

* * * * *